June 13, 1961 A. MAZZA 2,987,990
DEVICES FOR THE ROLLING AND BINDING OF MEAT IN GENERAL
Filed April 11, 1957 2 Sheets-Sheet 1
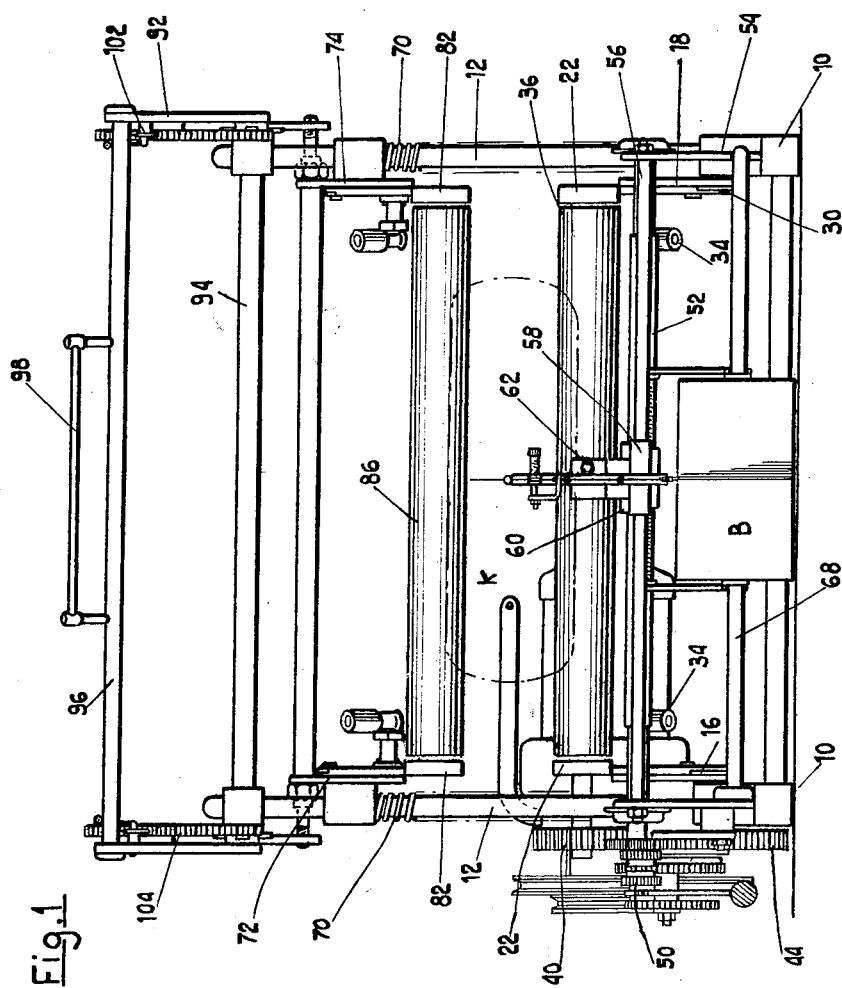

June 13, 1961 A. MAZZA 2,987,990
DEVICES FOR THE ROLLING AND BINDING OF MEAT IN GENERAL
Filed April 11, 1957 2 Sheets-Sheet 2

United States Patent Office 2,987,990
Patented June 13, 1961

2,987,990
DEVICES FOR THE ROLLING AND BINDING OF MEAT IN GENERAL
Angelo Mazza, 6 Via Cimitero, Trezzo d'Adda, Italy
Filed Apr. 11, 1957, Ser. No. 652,142
7 Claims. (Cl. 100—219)

This invention relates to a device designed for the rolling and binding of meat in general and of bacon in particular.

It is, an object of the device according to the invention to provide for a consistent and even binding of the meat and it is particularly another object of the invention to have the above device allowing the meat or bacon to be submitted to a continuous rolling action while being bound.

The device according to the invention is characterized in that it comprises at least one roller, coupled with a driving motor and cooperating with at least two support and guide members for the meat or bacon to be rolled, a carriage, running on guides fitted parallel to the roller centerline, being provided with at least one thread or string guide, as well as with braking and driving means, these latter being driven by the aforestated motor.

In an advantageous embodiment form the device according to the invention comprises at least three rollers with their axes parallelly arranged relative to one another; at least one of such rollers being torsionally connected with the driving motor, whereas the remaining rollers are fitted loose on their axes, and the carriage with the thread guide being under the control of a spindle-nut unit, which is caused to rotate by the driven roller, through a change gear.

The invention will be disclosed in the following description of an advantageous embodiment form thereof, as well as of its operation and modification and changes which could be made thereto, taken with the accompanying drawing, both description and drawing being given only as a not restrictive example of same invention.

Figure 2:
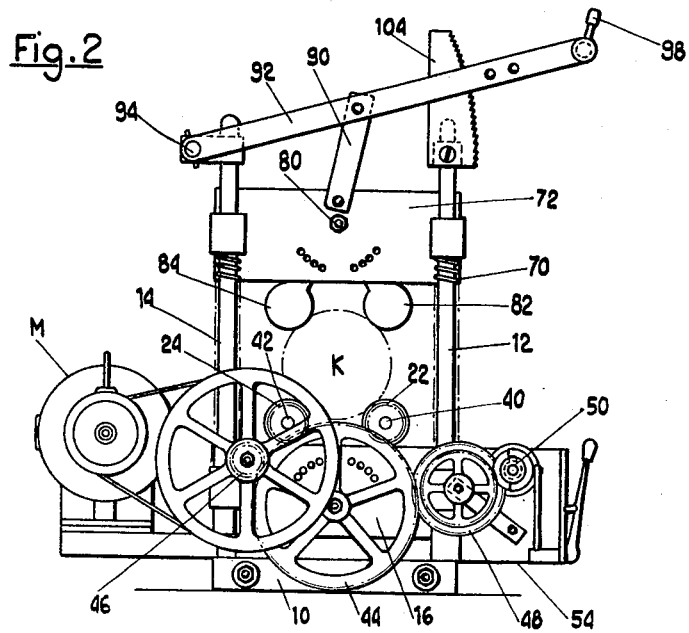

In said drawing:

FIGS. 1 and 2 respectively show a front and side elevation of a device according to the invention.

Figure 3:
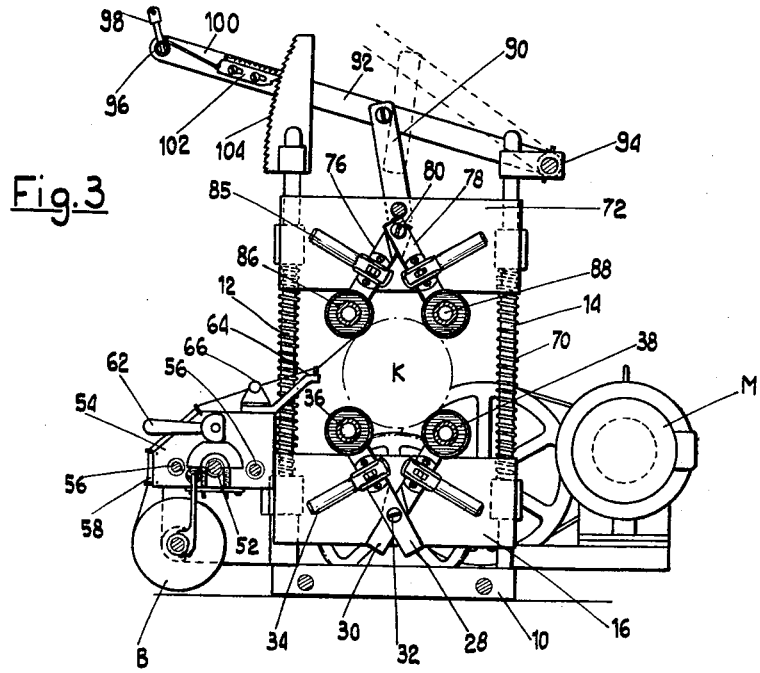

FIG. 3 is a cross-sectional view of same device.

Referring now to the above figures, the device comprises a base 10, whereon the pairs of uprights 12 and 14 are secured.

Any of the plates 16—18, fastened to uprights 12—14, is provided with a pair of supports 22—24, ending with arms 28—30, which are pivoted with each other by means of a pin 32, as fitted on the corresponding plate 16—18.

Any of the arms 28—30 is also fitted with a handle 34, to actuate a lock bolt, kept under the action of a spring, and that can be engaged into anyone of a row of holes 17, drilled along a curved line on the plates 16—18.

Thus, it is possible to adjust the distance between the axes of supports 22—24. Rollers 36, 38, formed with longitudinal grooves to provide gripping teeth on the peripheral surface thereof are mounted for rotation about their axes respectively on supports 22, 24. Instead of forming the grooves directly in the rollers, the grooves could advantageously be obtained by having the rollers 36, 38 covered with a jacket of plastic substance formed with suitable longitudinal grooves.

The pinions 40—42 are keyed on one end of rollers 36—38 and engage with a central gear 44, the journal of which is secured to side plate 16 in such a position that its axis registers with the axis of pin 32.

The aforestated possibility to change the distance between the axes of rollers 36—38 can be thus reached without causing any change or trouble to the operative connection with the gear 44.

Gear 44 is driven by an electric motor M, through a suitable train of gears, which could consist also in only one pinion 46, keyed to the shaft of said motor.

A threaded spindle 52, fitted on suitable brackets 54, secured on one of the ends of plates 16—18, is driven through a suitable change gear 50, by the gear 48, also engaged with the aforestated gear 44.

The above brackets are connected to one another by tie rods 56, acting also as guides for a carriage 58, that is provided with a nut 60, cooperating with a lever 62, by means of which said nut can be brought into, or out of engagement with the spindle 52.

The carriage 58 is also provided with a thread guide 64 and a brake 66 for the binding thread or string, which is delivered by the bobbin B, supported by a rod 68, and that is caused to slide across this latter by the motion of carriage 58.

The coil springs 70, threaded on each pair of uprights 12—14, cooperate with sleeves as fitted on the plates 72—74, arranged opposite to previously stated plates 16—18 and that can be caused to slide, against the action of said springs 70, along the uprights 12—14.

Like the plates 16—18, also the plates 72—74 are formed with arms 76—78 pivoted with each other by means of a pin 80, secured to the plates as considered. The supports 82—84 are fitted at the ends of latter arms, to accommodate thereon a pair of grooved cylinders as rollers 86—88, shaped similarly to rollers as previously described.

Rollers 86, 88 are not driven but mounted in their supports for rotation about their axes.

The plates 72—74 are connected by means of suitable connecting rods 90, with a frame, made-up by a pair of levers 92, pivoted on a common pin 94, and connected with each other by a cross-member 96. Said cross-member 96 is provided with a handle 98, by means of which it can be turned, and has also tie-rods 100, acting on lock-bolts 102, which can be brought into engagement with toothed sectors 104, secured to front uprights 12.

Thus, the possibility is given to move the pairs of plates 72—74 along the uprights 12—14, against the action of springs 70. This will position the rollers 86—88 being driven nearer to, or away from the rollers 36—38.

After above statement, the operation of device will clearly appear.

The roll of meat or bacon to be bound is marked in the drawing by K, and it is placed between the aforestated pair of rollers after lifting of the rollers 86—88. Then, after placing said object K on the lower rollers 36—38 (which are arranged in such a manner that the distance between their axes is adjusted in conformity with the diameter of the roll to be bound) the cross member 96 is acted upon, thereby forcing the pair of plates 72—74 downward and bringing the pair of rollers 86—88 into engagement with said object K.

The end of the binding string, as delivered by the bobbin B, has been previously secured to said object K, whereby starting of the motor M causes the pair of rollers 36—38 to rotate in the same direction.

The object K is forced by the rollers 86—88 against the rollers 36—38, whereby it is caused to rotate.

Thus the string is continuously and evenly wound around the object K.

Such string is kept always stretched by means of the braking device 66, which is of the adjustable type, whereby the tension of the string can be altered at will.

The thread or string guide 64 serves to move the string across the surface of object being wound, with a rate proportional to the speed with which the threaded spindle 52 is actuated by the nut 60.

After the end of the binding operation, the carriage 58 is manually returned to its starting position after disengaging the nut 60 from the spindle 52 and, by acting on the handle 98, the pair of rollers 86—88 are lifted, whereby the bound object K can be removed.

It will clearly appear that, by altering the speed with which the threaded spindle 52 is driven (and such an alteration can be obtained by acting on the change-gear 50) a change of the winding pitch can take place. When the object K to be bound shows sizes exceeding a given limit, the device can be readily adapted to such sizes by acting on the handles 34 and 85, thereby adjusting in the required manner the distance between the axes of pairs of rollers 36—38 and 86—88.

However, the device can also fulfill its particular task even when the distance between the axes of pairs of rollers 36—38 and 86—88 is fixed, particularly when the binding operation is to be performed on products having nearly alike diameters.

The particular way in which the device according to the invention has been carried into effect, and particularly the provision of grooved rollers 36—38 and so on, allows to have also a rolling and pressing action exerted on the object K while it is being bound, above all when said object consists of rolled-up layers of meat for bacon (as i.e. roll-bacon).

In this latter case, by driving the rollers 36—38 in a like direction as that one of rolling the layers of meat or bacon, these latter will be submitted to a further tightening action while being bound, whereby the object K is really processed as required in the art. Moreover, the rolling action to which the object K underlies while being bound, will impart a more consistent and even shape to same object.

As previously stated, the device could be utilized also to have sausages and similar products rolled and bound.

While the invention has been described with some details, it is to be understood that the description is for the purpose of illustration only, and not definitive of the limits of the inventive idea. The right is reserved to make such changes in the details of construction and arrangement of parts as will fall within the scope of the attached claims.

What I claim is:

1. A meat rolling and binding device, comprising, in combination, a support having a base; a pair of driven rollers mounted spaced from each other for rotation about substantially parallel axes; first mounting means mounted on said support for mounting said driven rollers for rotation about their axes and for tilting movement toward and away from each other about a third axis located in a plane of symmetry parallel to and equally spaced from said driven roller axes; two pairs of uprights projecting substantially normal to the axes of said driven rollers from said support and being respectively arranged parallel to and spaced from each other on opposite sides of said plane of symmetry; a pair of support plates respectively slidably mounted on said two pairs of uprights for sliding movement in longitudinal direction of the latter toward and away from said base; spring means respectivley engaging said support plates and tending to move the latter away from said base; locking means for locking said support plates against the force of said spring means; a pair of guide rollers mounted spaced from each other and from said driven rollers extending in longitudinal direction between said support plates; second mounting means mounted on said support plates for carrying said guide rollers for rotation about their axes and for tilting movement about an axis located in said plane of symmetry and being spaced from and substantially parallel to said third axis; and drive means for driving said driven rollers.

2. A meat rolling and binding device, comprising, in combination, a support having a base; a pair of driven rollers mounted spaced from each other for rotation about substantially parallel axes; first mounting means mounted on said support for mounting said driven rollers for rotation about their axes and for tilting movement toward and away from each other about a third axis located in a plane of symmetry parallel to and equally spaced from said driven roller axes; two pairs of uprights projecting substantially normal to the axes of said driven rollers from said support and being respectively arranged parallel to and spaced from each other on opposite sides of said plane of symmetry; a pair of support plates respectively slidably mounted on said two pairs of uprights for sliding movement in longitudinal direction of the latter toward and away from said base; a plurality of coil springs respectively mounted about said uprights and being located between said base and said supporting plates, said coil springs respectively engaging said support plates and tending to move the latter away from said base; locking means for locking said support plates against the force of said coil spring means; a pair of guide rollers mounted spaced from each other and from said driven rollers extending in longitudinal direction between said support plates; second mounting means mounted on said support plates for carrying said guide rollers for rotation about their axes and for tilting movement about an axis located in said plane of symmetry and being spaced from and substantially parallel to said third axis; and drive means for driving said driven rollers.

3. A meat rolling and binding device comprising, in combination, a stationary support; a pair of driven rollers arranged for rotation about substantially parallel axes on opposite sides of a plane of symmetry of the device parallel to said roller axes; first adjustable mounting means mounted on said stationary support for mounting said driven rollers for rotation about their axes and for independent adjustment of the distance of each of said driven rollers from said plane of symmetry; a movable support operatively connected to said stationary support for movement toward and away therefrom; a pair of guide rollers arranged for rotation about axes substantially parallel to said axes of said driven rollers on opposite sides of said plane of symmetry and spaced from said driven rollers; second adjustable mounting means mounted on said movable support for mounting said guide rollers for rotation about their axes and for independent adjustment of the distance of each of said guide rollers from said plane of symmetry; adjusting means for adjusting the position of said movable support relative to said stationary support without affecting the adjusted position of said rollers relative to said plane of symmetry; and drive means for driving said driven rollers.

4. A meat rolling and binding device comprising, in combination, a stationary support; a pair of driven rollers arranged for rotation about substantially parallel axes on opposite sides of a plane of symmetry of the device parallel to said roller axes; first adjustable mounting means mounted on said stationary support for mounting said driven rollers for rotation about their axes and for independent adjustment of the distance of each of said driven rollers from said plane of symmetry, said first adjustable mounting means including a pair of arms tiltably mounted adjacent one of the ends thereof on said stationary support for tilting movement about a third axis located in said plane of symmetry and carrying adjacent the other ends thereof said pair of driven rollers, respectively; a movable support operatively connected to said stationary support for movement toward and away therefrom; a pair of guide rollers arranged for rotation about axes substantially parallel to said axes of said driven rollers on opposite sides of said plane of symmetry and spaced from said driven rollers; second adjustable mounting means mounted on said movable support for mounting said guide rollers for rotation about their axes and for independent adjustment of the distance of each of said guide rollers from said plane of symmetry, said second adjustable mounting means including a pair of arms tiltably mounted adjacent one of the ends thereof on said movable support for tilting movement about an axis parallel to said third axis and located in said plane of symmetry, said pair of arms carrying adjacent the other ends thereof said pair of guide rollers, respectively; adjusting means for adjusting the position of said movable support relative to said stationary support without affecting the adjusted position of said rollers relative to said plane of symmetry; and drive means for driving said driven rollers.

5. A meat rolling and binding device comprising, in combination, a stationary support; a pair of driven rollers arranged for rotation about substantially parallel axes on opposite sides of a plane of symmetry of the device parallel to said roller axes; first adjustable mounting means mounted on said stationary support for mounting said driven rollers for rotation about their axes and for independent adjustment of the distance of each of said driven rollers from said plane of symmetry, said first adjustable mounting means including a pair of arms tiltably mounted adjacent one of the ends thereof on said stationary support for tilting movement about a third axis located in said plane of symmetry and carrying adjacent the other ends thereof said pair of driven rollers, respectively; a movable support operatively connected to said stationary support for movement toward and away therefrom; a pair of guide rollers arranged for rotation about axes substantially parallel to said axes of said driven rollers on opposite sides of said plane of symmetry and spaced from said driven rollers; second adjustable mounting means mounted on said movable support for mounting said guide rollers for rotation about their axes and for independent adjustment of the distance of each of said guide rollers from said plane of symmetry, said second adjustable mounting means including a pair of arms tiltably mounted adjacent one of the ends thereof on said movable support for tilting movement about an axis parallel to said third axis and located in said plane of symmetry, said pair of arms carrying adjacent the other ends thereof said pair of guide rollers, respectively; adjusting means for adjusting the position of said movable support relative to said stationary support without affecting the adjusted position of said rollers relative to said plane of symmetry; and drive means for driving said driven rollers, said drive means including a gear coaxial with said third axis, and a pair of pinions meshing with said gear and respectively coaxially fastened to the pair of driven rollers for driving the same upon rotation of said gear.

6. A meat rolling and binding device comprising, in combination, a stationary support; a pair of drven rollers arranged for rotaton about substantially parallel axes on opposite sides of a plane of symmetry of the device parallel to said roller axes; first adjustable mounting means mounted on said stationary support for mounting said driven rollers for rotation about their axes and for independent adjustment of the distance of each of said driven rollers from said plane of symmetry, said first adjustable mounting means including a pair of arms tiltably mounted adjacent one of the ends thereof on said stationary support for tilting movement about a third axis located in said plane of symmetry and carrying adjacent the other ends thereof said pair of driven rollers, respectively; a movable support operatively connected to said stationary support for movement toward and away therefrom; a pair of guide rollers arranged for rotation about axes substantially parallel to said axes of said driven rollers on opposite sides of said plane of symmetry and spaced from said driven rollers; second adjustable mounting means mounted on said movable support for mounting said guide rollers for rotation about their axes and for independent adjustment of the distance of each of said guide rollers from said plane of symmetry, said second adjustable mounting means including a pair of arms tiltably mounted adjacent one of the ends thereof on said movable support for tilting movement about an axis parallel to said third axis and located in said plane of symmetry, said pair of arms carrying adjacent the other ends thereof said pair of guide rollers, respectively; adjusting means for adjusting the position of said movable support relative to said stationary support without affecting the adjusted position of said rollers relative to said plane of symmetry; locking means for locking each of said arms independently in the tilted positions thereof; and drive means for driving said drven rollers.

7. A meat rolling and binding device comprising, in combination, a stationary support; a pair of driven rollers arranged for rotaton about substantially parallel axes on opposite sides of a plane of symmetry of the device parallel to said roller axes; first adjustable mounting means mounted on said stationary support for mounting said driven rollers for rotation about their axes and for independent adjustment of the distance of each of said driven rollers from said plane of symmetry; a movable support operatively connected to said stationary support for movement toward and away therefrom; spring means operatively connected to said stationary and said movable supports and tending to move said movable support away from said stationary support; a pair of guide rollers arranged for rotation about axes substantially parallel to said axes of said driven rollers on opposite sides of said plane of symmetry and spaced from said driven rollers; second adjustable mounting means mounted on said movable support for mounting said guide rollers for rotation about their axes and for independent adjustment of the distance of each of said guide rollers from said plane of symmetry; adjusting means for adjusting the position of said movable support relative to said stationary support without affecting the adjusted position of said rollers and for locking said movable support at the adjusted position thereof against the force of said spring means relative to said plane of symmetry; and drive means for driving said driven rollers.

References Cited in the file of this patent

UNITED STATES PATENTS

| | | |
|---|---|---|
| 636,110 | Brady | Oct. 31, 1899 |
| 857,141 | Wright | June 18, 1907 |
| 1,025,503 | Banister | May 7, 1912 |
| 1,733,434 | Taft | Oct. 29, 1929 |
| 1,870,399 | Butler | Aug. 9, 1932 |
| 1,881,183 | Griffith | Oct. 4, 1932 |
| 2,615,290 | Dyken | Oct. 28, 1952 |